United States Patent [19]

Takeda et al.

[11] Patent Number: 4,683,462

[45] Date of Patent: Jul. 28, 1987

[54] DEVICE FOR PROTECTING AUDIO EQUIPMENT IN VEHICLE AGAINST THEFT

[75] Inventors: Kazuma Takeda; Tsutomu Igarashi, both of Iwaki, Japan

[73] Assignee: Alpine Electronics Inc., Japan

[21] Appl. No.: 669,103

[22] Filed: Nov. 7, 1984

[30] Foreign Application Priority Data

Nov. 8, 1983 [JP] Japan ................................ 58-209471

[51] Int. Cl.[4] ........................ G08B 13/14; G06F 7/04; H04B 11/16

[52] U.S. Cl. ................................ 340/571; 340/825.32; 455/158

[58] Field of Search ................... 340/568, 571, 63, 64, 340/522, 540, 543, 825.31, 825.32, 825.03, 825.04, 825.37; 361/171-172; 455/345, 154, 158; 180/287

[56] References Cited

U.S. PATENT DOCUMENTS

| | | | |
|---|---|---|---|
| 3,836,901 | 9/1974 | Matto et al. | 340/571 X |
| 4,002,956 | 1/1977 | Minor et al. | 340/568 X |
| 4,103,289 | 7/1978 | Kolber | 340/825.32 |
| 4,237,450 | 12/1980 | Canez | 340/571 |
| 4,284,983 | 8/1981 | Lent | 340/571 X |
| 4,300,130 | 11/1981 | Fotheringham et al. | 340/571 X |
| 4,446,380 | 5/1984 | Moriya et al. | 361/172 X |
| 4,492,959 | 1/1985 | Mochida et al. | 361/172 X |
| 4,507,644 | 3/1985 | Abrahamson | 340/63 X |
| 4,531,232 | 7/1985 | Sakurai | 455/345 X |

FOREIGN PATENT DOCUMENTS

| | | |
|---|---|---|
| 8142436 | 4/1981 | Japan . |
| 1549179 | 7/1979 | United Kingdom . |
| 2023897 | 1/1980 | United Kingdom . |
| 2078296 | 12/1983 | United Kingdom . |

*Primary Examiner*—Glen R. Swann, III
*Assistant Examiner*—Thomas J. Mullen, Jr.
*Attorney, Agent, or Firm*—Guy W. Shoup

[57] ABSTRACT

A device for protecting audio equipment adapted to be installed in an automobile against theft includes a code storage section for previously storing a specific code in a memory, a code entry section for entering a code when the audio equipment is to be operated, a comparator circuit for comparing the code entered from the code entry section with the code read from the memory, and a muting circuit that usually mutes the electrical signal which would otherwise be applied to the power amplifier of the audio equipment. Unless the specific code is entered from the code entry section, the audio equipment is made inoperative by the electronic lock.

11 Claims, 3 Drawing Figures

DEVICE FOR PROTECTING AUDIO EQUIPMENT IN VEHICLE AGAINST THEFT

FIELD OF THE INVENTION

The present invention relates to a device for protecting audio equipment installed in a vehicle and, more particularly, to a device which does not permit such audio equipment to be operated unless a specific code for protection against theft is entered into the device, and which gives an alarm in the event that a person inadvertently touches the equipment.

BACKGROUND OF THE INVENTION

Audio equipments installed in vehicles are essentially lightweight and small in size. Therefore, they can easily be stolen.

Generally small-sized and lightweight audio equipment carried in vehicles, such as radios for automobiles, have been heretofore inserted in the front panel of an automobile and rigidly fixed. However, in case of theft, such an audio equipment can be operated simply by connecting it to a power supply. In other words, the conventional audio equipment does not have its own security device, but rather relies on the security system used for the vehicle as a whole, if any. Further, such audio equipment for automobile often does not incorporate any electronic lock or similar means for protecting against theft. Thus, such audio equipment are hardly resistant to thieves. In addition, if a radio or other audio equipment is removed from the automobile without the owner's permission, a warning indicating that the equipment has an antitheft function is not given. That is, even if a thief makes contact with the equipment, the panel will not be illuminated, nor will a buzzer make a buzzing sound.

SUMMARY OF THE INVENTION

It is the main object of the present invention to provide a device which protects audio equipment installed in a vehicle against theft and which solves the foregoing problems.

This object is achieved by a device which permits a specific code to be previously stored and which keeps a muting circuit included in an audio equipment installed in a vehicle in operative condition unless a specific code is entered, i.e., it acts as a kind of electronic lock. Further, if a person inadvertently touches the audio equipment without operating the ignition key, or applying power to the audio equipment, the device gives an alarm to notify any unauthorized intruder that the audio equipment has an electronic locking feature.

In summary, the antitheft device according to the invention comprises: a storage code selector section for previously storing a specific code for preventing theft; a code entry section for entering a code; a comparator and control section for comparing the code entered from the code entry section with the code read from the storage code selector section; and a muting circuit for releasing the audio output delivered from the audio equipment from its muted condition in response to the signal from the comparator and control section. The device also includes a lamp to be turned on and off or an audible alarm activated according to the signal from the code entry section at least under the condition that the power switch of the audio equipment is open after the release of the muting, and an intruder touches the audio equipment.

Other objects and features of the invention will be apparent from the ensuing description taken in connection with the accompanying drawings.

DETAILED DESCRIPTION OF THE INVENTION

Figure 1:
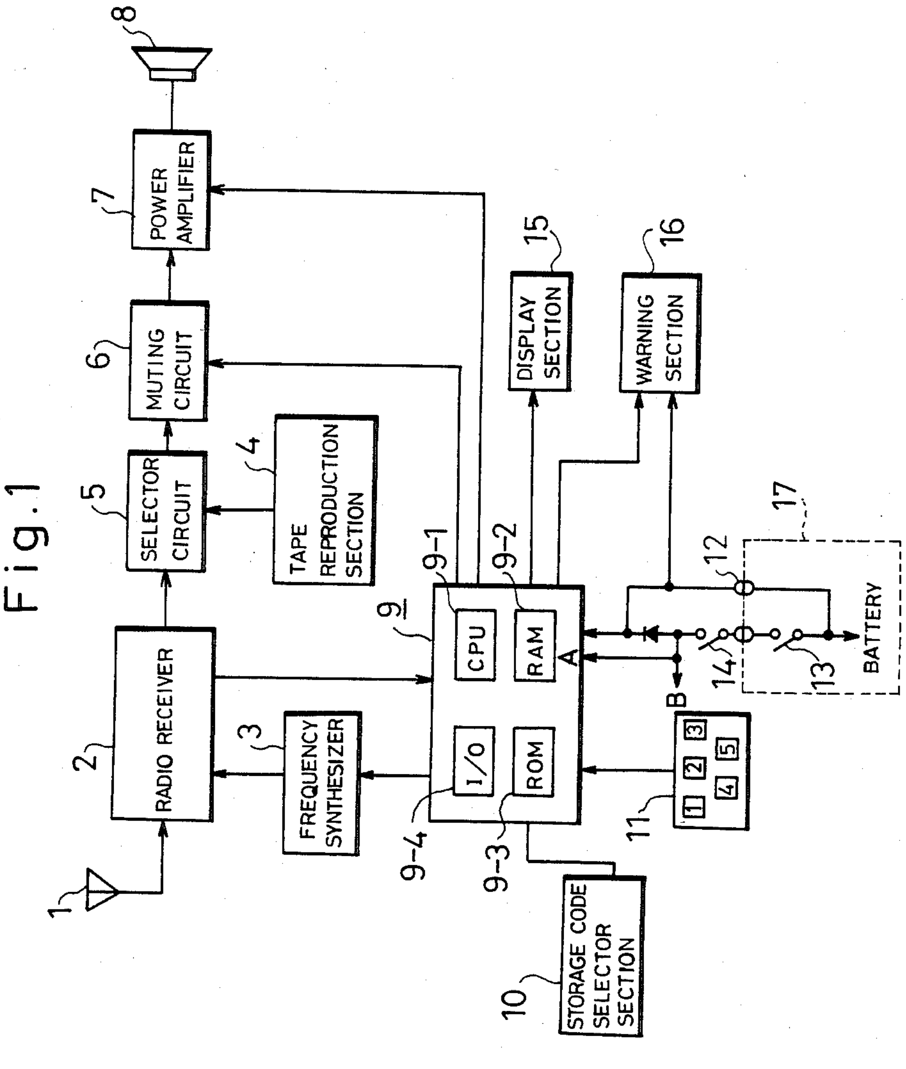
FIG. 1 is a circuit diagram of an antitheft device according to the present invention.

Referring to FIG. 1, there is shown an audio equipment comprising an antenna 1, a radio receiver 2, a frequency synthesizer 3, a tape reproduction section 4, a selector circuit 5, a muting circuit 6, a power amplifier 7, and a loud speaker 8. This audio equipment is installed in a vehicle 17 together with an antitheft device embodying the concept of the present invention. The antitheft device which protects the audio equipment against theft is composed of a central processing unit 9-1, a random-access memory 9-2, a read-only memory 9-3, an input/output 9-4, a storage code selector section 10, a keyboard 11, a power line 12, an accessory switch 13, a power switch 14, a display section 15, and a warning section 16. The CPU 9-1, the RAM 9-2, the ROM 9-3, and I/O 9-4 constitute a control section 9.

The radio receiver equipped with the tape player has a known structure. The operation of this audio equipment is next briefly described.

A radio wave signal is received by the antenna 1, and the resultant electrical signal is applied to the radio receiver 2. A locally generated frequency from the synthesizer 3 is mixed with the electrical signal in the receiver 2 so that the receiver may be tuned to a desired frequency of broadcast. The obtained audio signal is demodulated and applied to the selector circuit 5. The selector circuit 5 determines whether the audio signal from the radio receiver 2 or the audio signal from the tape reproduction section 4 is applied to the muting circuit 6. The output from the muting circuit 6 is furnished to the power amplifier 7, which increases the power of its incoming audio signal and supplies it to the loud speaker 8. Then, the speaker 8 produces an audible sound.

The synthesizer 3 delivers a specific, locally generated frequency specified by the control section 9 to the radio receiver 2. This locally generated frequency is used to receive a specific broadcast which is or has previously been indicated by the keyboard 11. In the case where an automatic tuning is performed according to the instruction from the keyboard 11, the control section 9 causes the synthesizer 3 to deliver a locally generated frequency that is swept over a range of frequencies to the radio receiver 2. Further, the control section 9 automatically adjusts the locally generated frequency in such a way that the level of the audio signal received by the radio receiver 2 is higher than a predetermined level set for a given volume and at its peak level, in order to optimize the reception condition. This automatic tuning is effected in accordance with a program which is stored in the read-only memory 9-3 for indicating a given sequence of instructions. Various items of data for intermediate processing may be stored in the random-access memory 9-2 that allows data to be written and read where the need arises. The input/output 9-4 is a medium or device for giving instructions to the synthesizer 3 or receiving the audio signal from the radio receiver 2 for detecting its level.

When the power switch 14 is closed, the voltage as supplied from the battery of the vehicle is passed through a terminal B and fed to the various units to make them operative. The novel device for protecting the audio equipment against theft is next described in detail.

Referring again to FIG. 1, the muting circuit 6 usually functions to prevent an audio signal from being applied to the power amplifier 7 from the selector circuit 5. When a prescribed code is entered on the keyboard 11 and the electronic lock established by the antitheft device is released, the audio signal is allowed to be supplied to the power amplifier 7. Then, the user can hear music or the like through the speaker 8.

The control section 9 permits the aforementioned automatic tuning and allows reception of the audio signal from a broadcast station for which the receiver has already been set. In addition, the control section 9 controls various functions of the antitheft device according to the invention in the manner described below.

The storage code selector section 10 stores a code for preventing theft. The keyboard 11 has a key matrix, and a diode is disposed in a given position within the key matrix to permit the storage of the code. The position of the diode is read by the CPU 9-1 in the control section 9, which then converts it into a certain form of code. Generally, antitheft codes are set by the manufacturer before the device is shipped, and the user is unable to change them.

The keyboard 11 indicates the automatic tuning as mentioned previously and gives an instruction for reception of a preselected broadcast. Further, the keyboard is employed to enter a specific code for making the antitheft device inoperative. Although the keyboard is is designed for selection of broadcast in the present example, it is also possible to use a keyboard adapted for selection of tape track to be reproduced.

The display section 15 acts to display the frequency of received broadcast and also to present a display for urging the user to enter the specific code for preventing theft.

The warning section 16 sounds a warning or causes the light on the panel to be turned on and off for preventing theft.

Figure 2:
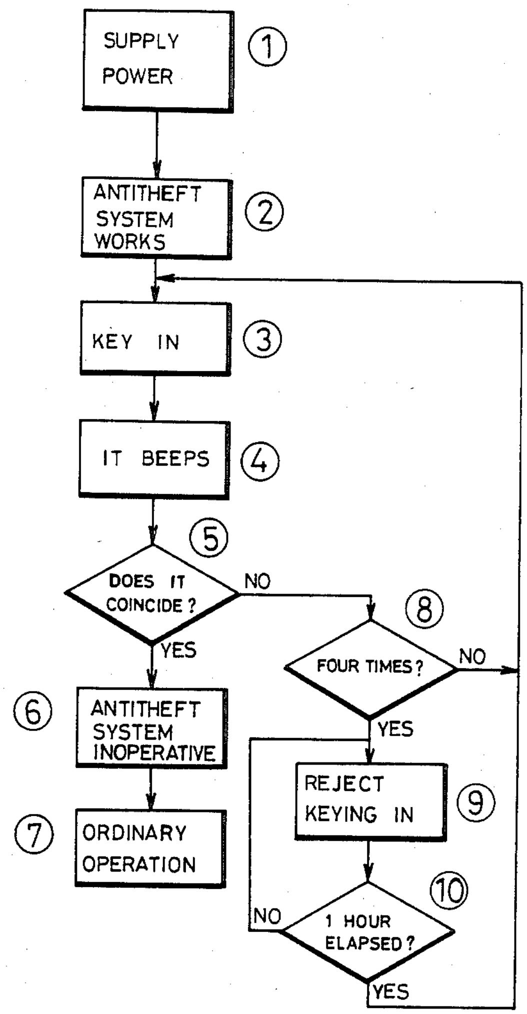
FIG. 2 is a flowchart showing a sequence of operations performed by the device of FIG. 1.

The electric lock used to prevent theft is next described by referring to the flowchart of FIG. 2. The audio equipment equipped with the tape player as shown in in FIG. 1 is installed in the vehicle 17. The control section 9 is connected to the power line 12 of the battery of the vehicle 17 (step 1). Then, the control section 9 operates, making the antitheft device operative (step 2). A representation "CODE" is presented on the display section 15. Under this condition, the control section 9 delivers a muting signal to the muting circuit 6 and so the audio signal from the selector circuit 5 is not applied to the power amplifier 7. Hence, the speaker 8 produces no sound.

The five keys on the keyboard 11 are depressed in turn to enter the specific code (step 3). If a numeral consisting of five digits, for example, is entered, the equipment is caused to beep (step 4), indicating that all the digits constituting the specific code have been entered. Application of additional digits will be rejected.

If the entered code made up of the given number of digits coincides with the code previously stored by the storage code selector section 10 ("YES" decision in step 5), the presentation "CODE" on the display section 15 is erased, and the audio equipment is unlocked by the antitheft device (step 6). Then, the control section 9 ceases to deliver the muting signal to the muting circuit 6, in order to initiate ordinary operations (step 7). Thus, the automatic tuning mentioned above or reception of a broadcast to which the radio receiver has already been tuned is made possible.

If the code does not coincide with the previously stored code ("NO" decision in step 5), another code can be entered by means of the keyboard as long as keying in from the keyboard 11 is not repeated four times ("NO" decision in step 8). If "YES" decision is given in step 8, additional entry is rejected (step 9). This means that four successive incorrect entries of code are judged not to be keyed in by the owner of the equipment. Therefore, the electronic lock is caused to function to protect the audio equipment against theft. If a certain period of time has elapsed ("YES" decision in step 10), it is possible to key in a code again.

After the audio equipment is released from the electronic lock by entering the specific code, the equipment can be used as ordinary audio equipment installed in an automobile unless the voltage applied to control section 9 is cutoff. In case this voltage to the control section 9 has once been cut off to move the audio equipment into another automobile or for another reason, the electronic lock constituting the antitheft device must be made inoperative. Accordingly, one who has not been told the correct code by the owner is unable to operate the audio equipment.

Figure 3:
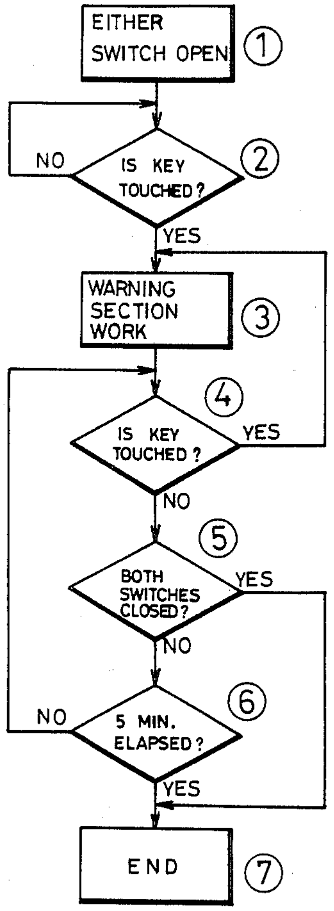
FIG. 3 is a flowchart showing the operation of the warning device shown in FIG. 1.

The warning system is next described by referring to the flowchart of FIG. 3. When the electronic lock is rendered inoperative by connecting the control section 9 shown in FIG. 1 to the power supply line 12 of the battery of the vehicle 17 and entering the specific code, which has been already described in connection with the flowchart of FIG. 2, by means of the keyboard 11, the voltage appearing at terminal A of the control section 9 is at a low level if either the accessory switch 13 or the power switch 14 is open. This makes the warning system operative (step 1). If both switches 13 and 14 are closed, the voltage at the terminal A takes up a high level, not allowing the warning system to operate.

When the warning system is in operation, if a person touches one, of the keys such as a touch switch on the keyboard 11 ("YES" decision in step 2), the control section 9 delivers a warning signal to the warning section 16 to make a buzzing sound for five minutes, for example, or to turn on and off the lamp on the control section (step 3). If the accessory switch 13 and the power switch 14 are closed ("YES" decision in step 5), the voltage at the terminal A of the control section 9 assumes a high level, terminating the warning operation (step 7). Thus, an authorized person who has inadvertently set off the audio equipment warning system can terminate it by turning the ignition key on. In the case of a person not intending to steal the audio equipment who inadvertently sets the warning system off, after five minutes have elapsed after the key was touched ("YES" decision in step 6), the warning is terminated (step 7).

As thus far described, according to the present invention, a specific code for preventing theft is converted into the form of an electrical signal and previously stored in the audio equipment. When the audio equipment is installed in the vehicle and the power is first turned on, as long as the prescribed code is not entered, the muting circuit, namely the electronic lock, operates, making the audio equipment inoperative. If it is inadvertently touched by a person, it gives an alarm to increase the effect of the antitheft device. Further, even if has been stolen, it cannot be operated by simply supplying electric power to it, because the muting circuit serves to make the equipment inoperative. This further enhances the antitheft effect. In addition, the keyboard for selecting broadcasts in a known manner is also used to key in the specific code, resulting in a great simplicity of the structure. This contributes to a reduction in cost.

What is claimed is:

1. In an audio equipment adapted to be installed in a vehicle and having an audio section for providing an audio sound output, the improvement of said audio equipment being provided integrally with its own antitheft device comprising:

an entry section including a plurality of keys for entering a selected number;

a storage section for storing a code number;

a power section for connecting said audio equipment including said anti-theft device to a battery when said audio equipment is installed in a vehicle;

control means connected to said entry section, storage section, and power section, which becomes operative upon connecting said power section to the battery of a vehicle, for receiving a number entered on said entry section and comparing said entered number to said code number stored in said storage section, and for providing a signal indicating if said entered number and said stored code number match; and a muting circuit for muting the audio section from providing an audio sound output or for releasing the audio section from a muted condition to an operative condition depending upon whether said signal is provided by said control means;

further including a second power section for receiving an operative voltage supplied to said anti-theft device when a power switch in the vehicle is switched on, said control means including a detector for detecting if said second power section is not provided with the operative voltage and if a key of said entry section is depressed, and a warning section connected to said control means which provides a warning signal if both said conditions are detected.

2. An audio equipment having an integral anti-theft device according to claim 1, wherein once said signal is provided by said control means, said audio section remains operative for as long as said power section remains connected to the battery of the vehicle in which the audio equipment is installed, said control means including a second detector for detecting if said power section becomes disconnected from said battery.

3. An audio equipment having an integral anti-theft device according to claim 1, wherein said control means provides a signal for muting said audio section for a selected time period after a predetermined number of incorrect number entries on said entry section.

4. An audio equipment having an integral anti-theft device according to claim 1, wherein said audio equipment is a radio including means for receiving broadcast radio signals and a channel selector having a plurality of keys for tuning said audio equipment to corresponding broadcast channels, and wherein said channel selector is also connected to said control means and constitutes said entry section.

5. An audio equipment having an integral anti-theft device according to claim 4, further comprising a display section connected to said control means for providing a visual display of a prompt requesting entry of the code number or a matching number, and of a broadcast channel number selected on said channel selector.

6. An audio equipment having an integral anti-theft device according to claim 1, wherein said warning signal activates a sound alarm.

7. An audio equipment having an integral anti-theft device according to claim 1, wherein said warning signal activates a lamp which is flashed on and off.

8. An audio equipment having an integral anti-theft device according to claim 1, wherein said control means is connected to said audio section and further includes means for causing said audio section to emit a confirmation sound when a predetermined number of digits corresponding to the number of digits of said stored code number have been entered on said entry section.

9. In an audio equipment adapted to be installed in a vehicle and having an audio section for providing an audio sound output, the improvement of said audio equipment being provided integrally with its own antitheft device comprising:

an entry section including a plurality of keys for switching said audio section to selected channels;

a first power section for connecting said audio equipment including said anti-theft device to a battery when said audio equipment is installed in a vehicle;

a second power section for receiving an operative voltage supplied to said anti-theft device when a power switch in the vehicle is switched on;

control means connected to said entry section and said first and second power sections, which becomes operative upon connecting said first power section to the battery of a vehicle, for detecting if said second power section is not provided with the operative voltage and if a key of said entry section is depressed; and a warning section connected to said control means which provides a warning signal if both said conditions are detected.

10. An audio equipment having an integral anti-theft device according to claim 9, wherein said warning signal activates a sound alarm.

11. An audio equipment having an integral anti-theft device according to claim 9, wherein said warning signal activates a lamp which is flashed on and off.

* * * * *